(No Model.)
O. C. STANLEY
PIPE WRENCH.
No. 411,266.  Patented Sept. 17, 1889.
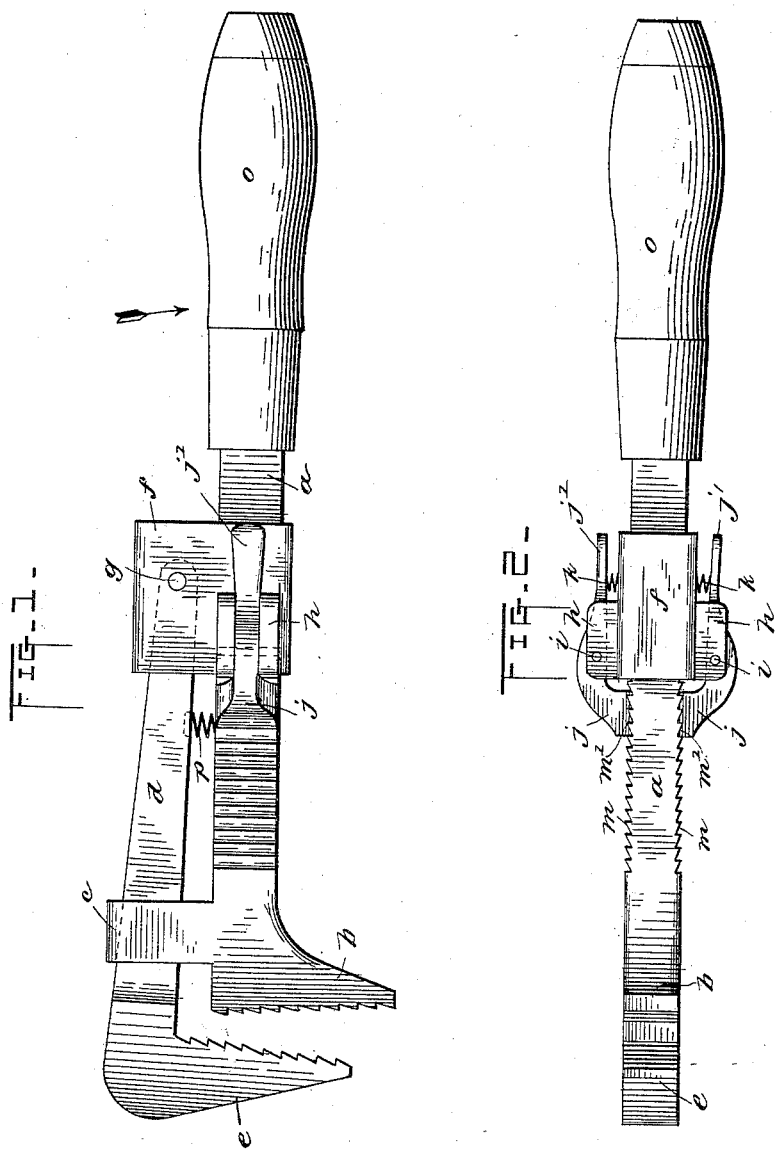

UNITED STATES PATENT OFFICE.

ORAMEL C. STANLEY, OF BOSTON, ASSIGNOR TO CHARLES F. BROWN, OF READING, MASSACHUSETTS.

PIPE-WRENCH.

SPECIFICATION forming part of Letters Patent No. 411,266, dated September 17, 1889.

Application filed April 11, 1889. Serial No. 306,806. (No model.)

*To all whom it may concern:*

Be it known that I, ORAMEL C. STANLEY, of Boston, in the county of Suffolk and State of Massachusetts, have invented certain new and useful Improvements in Pipe-Wrenches, of which the following is a specification.

This invention relates to pipe-wrenches having rapidly-adjustable jaws, one of which slides upon the shank to which the other is affixed, and is locked upon said shank by a dog or dogs engaging ratchet-teeth on the shank.

The invention has for its object to provide certain improvements relating to the means for engaging the sliding jaw with the ratcheted shank, and to the general construction and arrangement of the sliding jaw; and to these ends it consists in the improvements which I will now proceed to describe and claim.

Of the accompanying drawings, forming a part of this specification, Figure 1 represents a side elevation of a wrench embodying my improvements. Fig. 2 represents a bottom or edge view of the same.

The same letters of reference indicate the same parts in both the figures.

In the drawings, $a$ represents the shank of the wrench, on the outer end of which is formed the fixed jaw $b$, projecting from one side of the shank. On said shank, near its outer end, is formed a yoke or loop $c$, through which passes the arm $d$, on which the outer jaw $e$ is formed, said yoke projecting from the side of the shank opposite the side on which the jaw $b$ is formed.

$f$ represents a slide or carrier, which is formed to move freely upon the shank $a$, and is connected to the arm $d$ by a pivot $g$. On the sides of said carrier are lugs or ears $h\ h$, to which are pivoted at $i\ i$ two dogs $j\ j$. Said dogs are extended beyond the slide $f$ and are pressed by springs $k\ k$ against the sides of the shank $a$. Said shank is provided on its sides against which the dogs are pressed with ratchet-teeth $m$, and the ends of the dogs which bear against said sides are provided with corresponding ratchet-teeth $m'$, so that the pressure of the dogs against the sides of the shank by the springs $k\ k$ causes the engagement or locking of the slide $f$ to the shank at two points. It will be seen that the two dogs engaged, as described, with two series of ratchet-teeth on the shank of the wrench afford a very secure connection between the slide or movable jaw-carrier $f$ and the shank $a$, and prevent the possibility of said slide and movable jaw slipping accidentally on the shank $a$.

The dogs $j\ j$ are provided with handles $j'\ j'$, projecting rearwardly toward the handle $o$ of the wrench, said handles enabling the dogs to be simultaneously thrown out of engagement with the ratchet-teeth $m\ m$ by inward pressure on the handles, the distance between the handles being such as to enable said pressure to be conveniently exerted by the thumb and finger of the hand which holds the wrench, so that an operator standing on a ladder or in any other position where he can use but one hand is enabled to both hold the wrench and adjust the movable jaw thereof with one hand.

$p$ represents a spring, which is inserted in a cavity formed in the inner side of the movable jaw-carrying arm $d$ and is interposed between said arm and the shank $a$, said spring acting to normally throw the arm $d$ outwardly from the shank $a$, as shown in Fig. 1. The outer jaw $e$ being thus held with a yielding pressure in a retracted position, when a pipe is inserted between the jaws $b\ e$ and the handle of the wrench is moved laterally in the direction indicated by the arrow in Fig. 1 the two jaws are closed upon the pipe by said movement in a manner which will be readily understood.

It will be observed that the form of the ratchet-teeth on the shank $a$ and jaws $j$ is such as to enable the movable jaw $e$, which is the outer jaw, to be pushed toward the fixed inner jaw $b$, the dogs slipping on the ratchet-teeth $m$ when pressure is applied to the jaw $e$, tending to force it toward the jaw $b$; but when pressure is exerted in the opposite direction on the jaw $e$—that is, in a direction which tends to separate the jaw $e$ from the jaw $b$—the ratchet-teeth $m$ and $m'$ will resist such movement. The operator is therefore enabled to close the jaws $e\ b$, while holding the wrench in one hand, by simply pressing the outer jaw against any fixed object without using the other hand, the arrangement of the dogs previously described enabling him to release the movable jaw and force it outwardly by the same hand, as above stated. The wrench can therefore be very conveniently operated in positions which enable the operator to use but one hand.

One series of ratchet-teeth and one jaw *j* may be used instead of two, the difference being one of degree only. I prefer the duplicate ratchets and dogs, because of the greater security thereby afforded.

I claim—

In a pipe-wrench, the combination of the shank *a*, the jaw *b*, having an inclined serrated face formed on the end of said shank and projecting from one side thereof, the yoke or loop *c*, formed on the opposite side of the shank from the jaw *b*, the ratchet-teeth *m*, formed on the shank between the sides from which the jaw *b* and yoke *c* project, the slide *f*, adapted to move on the shank, the swinging jaw *e*, having a serrated face which is inclined oppositely to the face of the jaw *b* and formed on an arm *d*, the inner end of which is pivoted at *g* to said slide, the spring *p* between the shank *a* and arm *d*, and the dogs *j*, pivoted to said slide and extended beyond the same, and having the teeth *m'*, adapted to engage the teeth *m* on the shank, all arranged and operating substantially as set forth.

In testimony whereof I have signed my name to this specification, in the presence of two subscribing witnesses, this 16th day of March, A. D. 1889.

ORAMEL C. STANLEY.

Witnesses:
C. F. BROWN,
W. C. RAMSEY.